(No Model.)

3 Sheets—Sheet 1.

J. J. ANTHONY.
CAR TRUCK.

No. 245,112.  Patented Aug. 2, 1881.

WITNESSES:
Chas. Niola
C. Sedgwick

INVENTOR:
J. J. Anthony
BY Munn & Co.
ATTORNEYS.

(No Model.) 3 Sheets—Sheet 2.

J. J. ANTHONY
CAR TRUCK.

No. 245,112. Patented Aug. 2, 1881.

WITNESSES:
Chas. Nida.
C. Sedgwick.

INVENTOR:
J. J. Anthony
BY Munn & Co.
ATTORNEYS.

(No Model.)

J. J. ANTHONY
CAR TRUCK.

No. 245,112.  Patented Aug. 2, 1881.

3 Sheets—Sheet 3.

WITNESSES:
Chas. Nida.
C. Sedgwick.

INVENTOR:
J. J. Anthony
BY Munn & Co.
ATTORNEYS.

UNITED STATES PATENT OFFICE.

JACOB J. ANTHONY, OF SHARON SPRINGS, NEW YORK.

CAR-TRUCK.

SPECIFICATION forming part of Letters Patent No. 245,112, dated August 2, 1881.

Application filed May 12, 1881. (No model.)

*To all whom it may concern:*

Be it known that I, JACOB J. ANTHONY, of Sharon Springs, in the county of Schoharie and State of New York, have invented a new and Improved Car-Truck, of which the following is a full, clear, and exact description.

The object of my invention is to provide a new and improved car-truck which is strong and durable and has a broad spring-bearing for the car-body, and which prevents undue wear of the wheels and rails at the curves of the latter. A further object of my invention is to facilitate lubricating the bearings of the car-wheel axles.

The invention consists in a car-truck provided with independent wheels, each wheel being provided with a separate axle fitting in a journal-box, in which it is held by a nut at its inner end, this journal-box resting on braced and strengthened transverse bottom plates of the car-truck frame, which is also provided with a longitudinal bed-plate supported by the transverse plates and bracing the frame.

The invention further consists in a wheel with an outward-projecting hub on the outer side and an annular recess on the inner side, to receive the sleeve end of the journal-box, this wheel being screwed to the axle, and also secured to the same by means of a pin passing through the hub into the axle.

The invention further consists in a reservoir-pipe for the lubricating material, which pipe is provided with branch pipes leading to the several journal-boxes, and with screw-caps at the ends, which caps are removed when the reservoir-pipe is to be cleaned.

The invention also consists in an improved bearing for the car-body, formed of a flat metal ring resting on transverse beams on the top of the truck, which ring is provided with apertures for receiving pins or bolts of a like upper ring, these pins being surrounded by spiral springs carrying the upper ring and resting on the lower ring. A flat ring with a heavy transverse bearing-plate of timber or metal rests upon the upper ring mentioned above, and can turn on the same, this turn-table ring and its bearing-plate being held on the truck by a heavy king-bolt contained in a vertical cylindrical casing surrounded by a spiral spring, which assists in supporting the turn-table ring.

Figure 1:
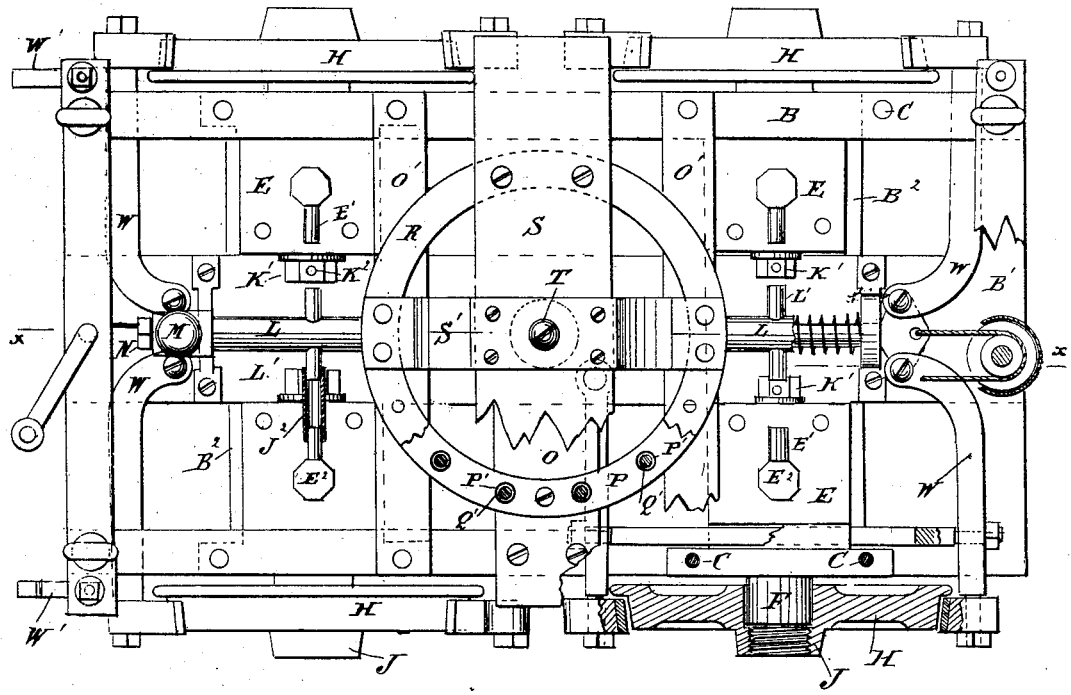
Figure 2:
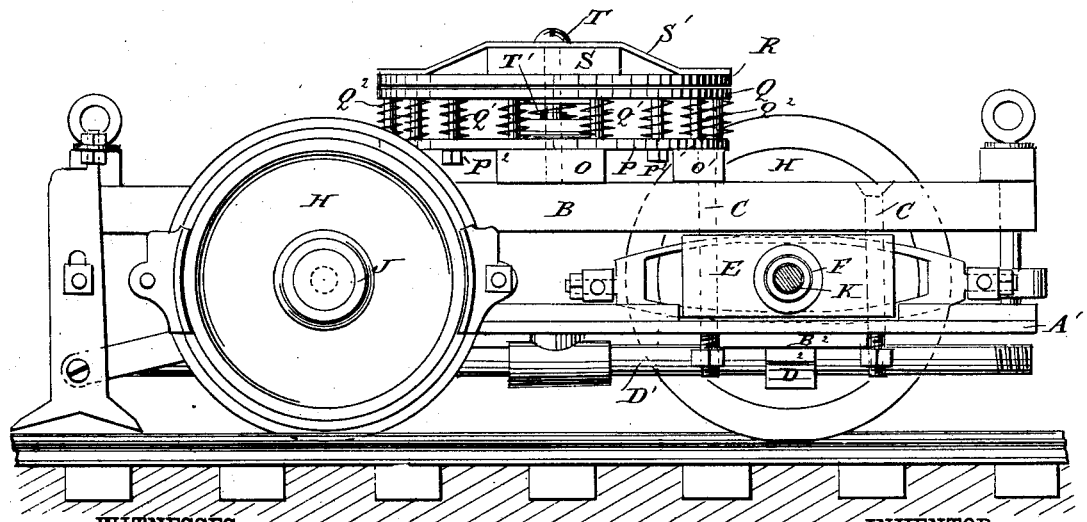
Figure 3:
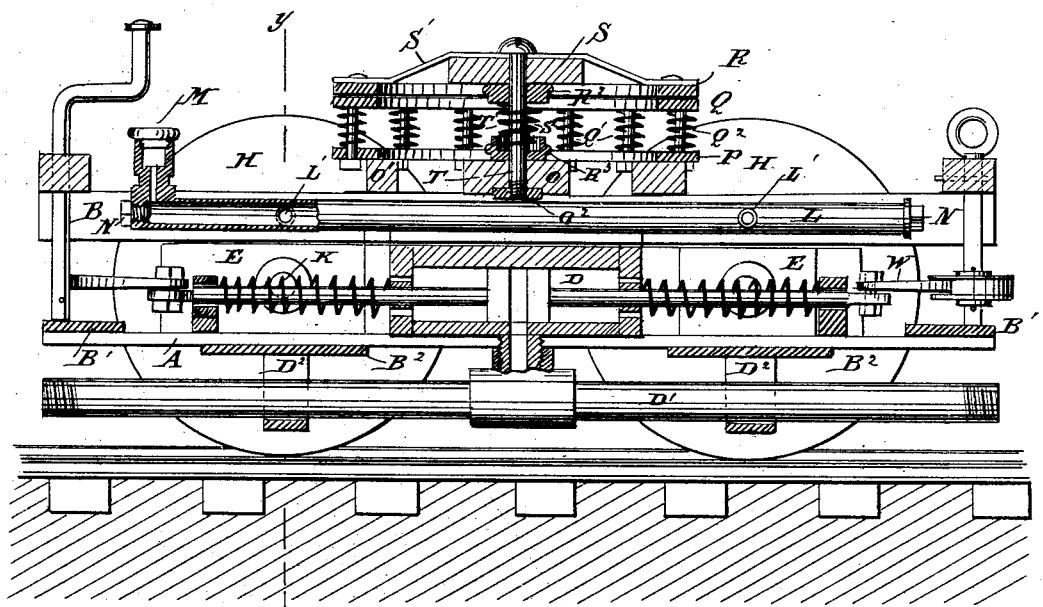
Figure 4:
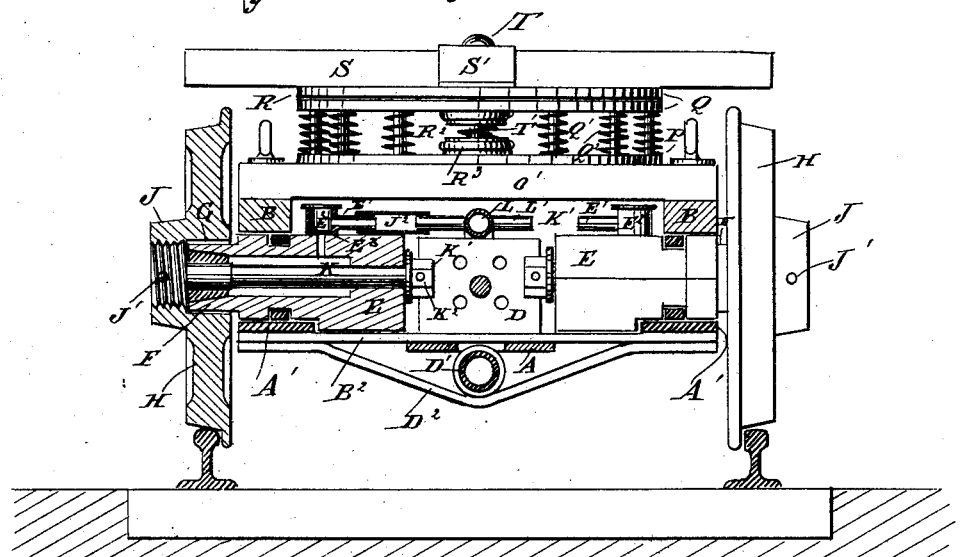
Figure 5:
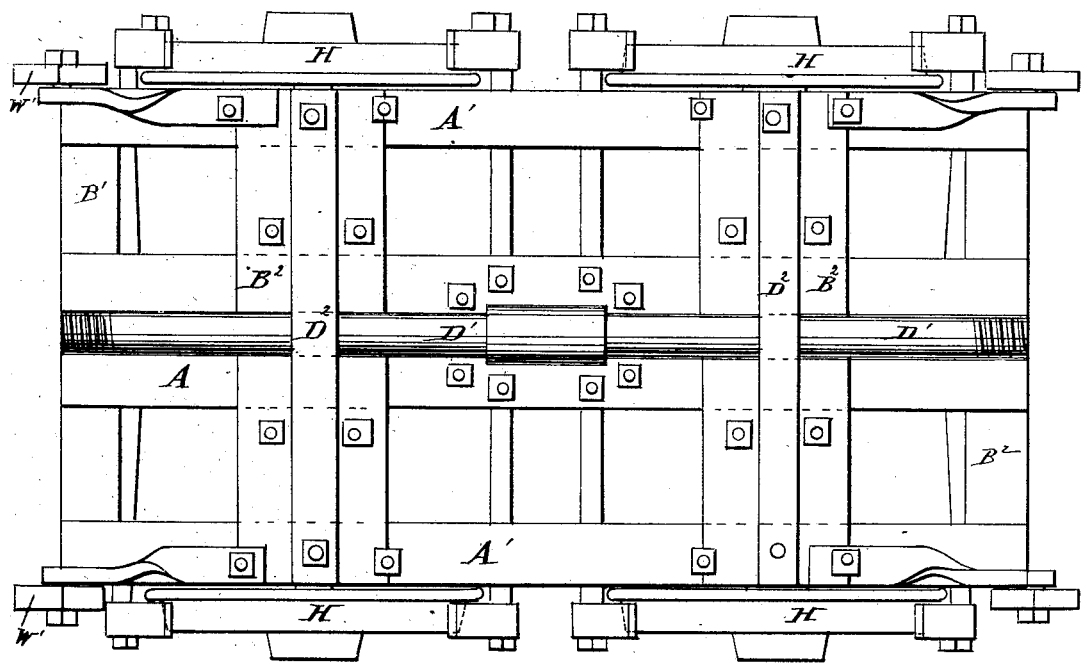
Figure 6:
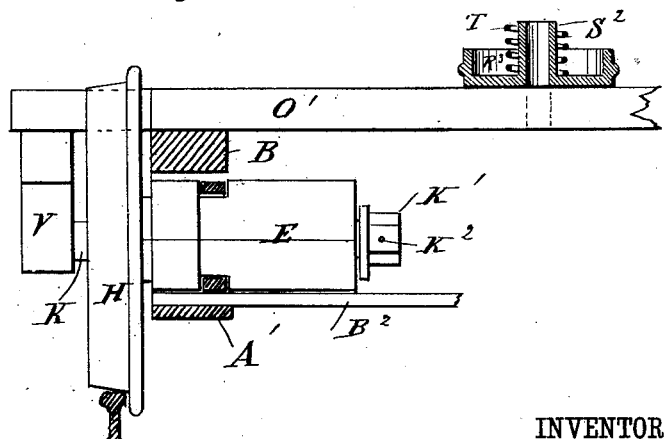

In the accompanying drawings, Figure 1 is a plan view of my improved car-truck, parts being shown in section and broken out. Fig. 2 is a longitudinal elevation, one of the axles being shown in section. Fig. 3 is a longitudinal sectional elevation of the same on the line $x\,x$, Fig. 1. Fig. 4 is a cross-sectional elevation of the same on the line $y\,y$, Fig. 3. Fig. 5 is a plan view of the under side of my improved car-truck. Fig. 6 is a detail elevation of one wheel and journal-box, showing a modification in the construction of the wheel and axle.

Similar letters of reference indicate corresponding parts.

The car-truck is constructed with an upper and lower frame, between which two united frames the journal-boxes are held. I preferably make the upper frame of wood and the lower frame of iron, but may make them both of iron, if desired. The lower frame is constructed with a central longitudinal bed-plate, A, supported by the intermediate transverse plates $B^2$, which, in turn, are carried or supported by the longitudinal end plates or bars, A', which, in turn, are suspended from the longitudinal end rails, B, of the upper frame by the bolts C C. The cylinder D of a steam or air brake, described in my Patent No. 196,320, dated October 23, 1877, rests on the middle of the bed-plate A, and the steam is conducted into this cylinder through a pipe, D', below the bed-plate A, which pipe D' is connected by proper coupling-pipes with a steam or air pipe leading to the locomotive.

Brace bars or rods $D^2$ are fastened to the ends of the transverse plates $B^2$, passing under the steam-pipe D', and form a strong truss with the transverse plates $B^2$.

A journal-box E, provided with tubular or cylindrical inside bearing-surfaces, rests upon each end of the transverse plates $B^2 B^2$, and between the longitudinal rail B of the upper frame and the longitudinal end plate or rail, A', of the lower frame, the outer edge of the journal-boxes being flush with outer surface or edge of these longitudinal rails. These journal-boxes are composed of a lower and of an upper half, which are bolted together. The bolts C C, which unite the upper and lower frames of the truck, pass through the widened outer ends of these journal-boxes, as shown in Figs. 1 and 2, whereby the journal-boxes are firmly and rigidly attached to the truck-frame. The journal-boxes are provided at the outer ends with tubular projections F, fitting in corresponding recesses G in the wheels H. These wheels H are provided on the inner side with an annular recess, G, as stated, and on the outer side with a projecting internally-threaded hub, J, into which the axle K is screwed, a pin, J', being passed through the hub and the corresponding end of the axle. The axle is passed through the journal-box, which is provided with suitable packing, and a nut, K', is screwed on the inner end of the axle projecting from the inner end of the journal-box, and this nut is firmly secured on the axle by a pin, K$^2$.

A reservoir-pipe, L, for lubricating material, is arranged above the journal-boxes parallel with the bed-plate A, and is provided with short arms L' corresponding with short arms E' of caps E$^2$ on the tops of the journal-boxes E, these arms E' and L' being connected by short pieces of rubber or other tubing J$^2$, so that the lubricating material can flow from the reservoir-pipe L to the several journal-boxes. This pipe L is provided at one end with an opening for filling in the lubricating material, this opening being closed by a screw-cap, M. The ends of the tube L are closed by screw-plugs N N, which can be removed when the tube L is to be cleaned. The caps E$^2$ on the journal-boxes are provided with filters E$^3$ to prevent impurities from passing into the journal-boxes.

A central transverse plate or beam, O, and two side transverse beams, O' O', are riveted to the top of the side bars, B B, of the upper frame, and a flat metal ring, P, provided with a series of apertures, P', is securely fastened on these beams O and O'. A like ring, Q, provided with a series of downward-projecting pins or bolts, Q', corresponding in position with the apertures P' of the ring P, is placed upon this ring P in such a manner that the pins or bolts Q' will pass through the apertures P'. A spiral spring, Q$^2$, surrounds each pin or bolt Q', and these springs press the ring Q and the load resting thereon upward. Nuts P$^2$ are screwed on the lower ends of the pins or bolts Q', to prevent them from being entirely withdrawn from the apertures P' by a sudden lurch or jump of the truck. A like ring, R, rests loosely on the upper ring, Q, and slides or turns on the same. A heavy transverse beam or plate, S, rests on the ring R, and is securely bolted to the same, and is also secured to the same by means of a brace plate or band, S', which is bolted to the ring R and to the upper surface of the beam S. A king-bolt, T, passes through the middle of the brace S', and through the middle of the beam S, through a tubular casing, S$^2$, on the beam O, the lower threaded end of this king-bolt taking in a threaded aperture in an iron transverse plate, O$^2$, below the beam O. A spiral spring, T', surrounds the tubular casing S$^2$, the upper end of this spring pressing against a bearing-plate, R$^2$, on the under side of the beam S, and the lower end of this spring resting on a bearing-plate, R$^3$, forming the base for the tubular casing S$^2$.

In some cases it may also be desirable to support the axle at both sides of the wheel, and to accomplish this the upper transverse beams, O', are extended beyond the longitudinal end beams, B, and an axle-box, V, is firmly attached to the projecting end of these beams O', the axle of the wheel being continued on the outside of the wheel, so as to fit into this box V, as shown in Fig. 6.

The brake-levers W W are constructed, pivoted, and connected in the same manner as described in my patent mentioned above.

The within-described truck can be constructed with any desired number of wheels and of any desired size, the dimensions of the several parts being greater or less, according to the load to be carried by the truck.

It is well known that the wheels of the ordinary car-trucks, having two wheels mounted rigidly on the same axle must slide or slip when the truck is on a curve, and this sliding or slipping of the wheels does not only wear off the wheels and the rails very rapidly, but is very apt to break the axle. Now, in my improved axle the wheels all revolve independently of each other, and in passing a curve the wheels on the outer track can revolve much more rapidly than the wheels on the inner rail, thereby avoiding sliding and slipping of the wheels on the rails. The car-body rests upon the beam S of the ring R, which, in turn, is supported by the springs Q$^2$, Q$^2$, and T'. As the ring R slides on the ring Q the car can turn the shortest curves without causing any twisting strains on the wheels. In all positions of the car-body, and all inclinations of the car body or truck, the load will be equally distributed on the several wheels and axles.

This truck can be used for freight or passenger cars, locomotives, tenders, &c. It is preferably provided with an ice-cutter, W', to remove snow and ice from the tracks.

Having thus described my invention, I claim as new and desire to secure by Letters Patent—

1. In a car-truck, the combination, with the truck-frame, of independent axles and journal-boxes, tranverse bottom plates and a longitudinal bed-plate, as shown and described.

2. In a car-truck, the combination, with the sleeve end of a journal-box, of a wheel having an outwardly-projecting hub and annular recess on the inner side, said wheel being secured to the axle by screw and pin, as shown and described.

3. In a car-truck, the combination, with a reservoir-pipe for the lubricant, of branch pipes and removable end caps, as shown and described.

4. In a car-truck, the combination, with the journal-boxes E, of the caps E$^2$, the reservoir-pipe L, for the lubricating material, and the connecting-pipes J$^2$, substantially as herein shown and described, and for the purpose set forth.

5. In a car-truck, the combination, with the bottom tranverse plates, $B^2$ $B^2$, of the steam-pipe $D'$, and of the brace-plate $D^2$, forming a truss with the plate $B^2$ and the pipe $D'$, substantially as herein shown and described, and for the purpose set forth.

6. In a car-truck, the combination, with the upper truck-frame, of the flat ring P, fastened thereon, the ring Q, the guide pins or bolts $Q'$, and the springs $Q^2$, substantially as herein shown and described, and for the purpose set forth.

7. In a car-truck, the combination, with the upper truck-frame, of the rings P and Q, the guide pins or bolts $Q'$, the springs $Q^2$, the ring R, sliding on the upper ring, Q, the transverse beam S, and the king-bolt T, substantially as herein shown and described, and for the purpose set forth.

8. In a car-truck, the combination, with the upper truck-frame, of the rings P and Q, the guide-pins $Q'$, the springs $Q^2$, the ring R, sliding on the ring Q, the transverse beam S, the king-bolt T, and spiral spring $T'$, surrounding it, substantially as herein shown and described, and for the purpose set forth.

JACOB J. ANTHONY.

Witnesses:
  HENRY AUSTIN,
  E. VINCENT TOWNSEND.